US008467934B2

(12) United States Patent
Kawasaki et al.

(10) Patent No.: US 8,467,934 B2
(45) Date of Patent: Jun. 18, 2013

(54) CONTROLLER OF HYBRID CONSTRUCTION MACHINE

(75) Inventors: Haruhiko Kawasaki, Tokyo (JP); Masahiro Egawa, Tokyo (JP)

(73) Assignee: Kayaba Industry Co., Ltd. (JP)

(*) Notice: Subject to any disclaimer, the term of this patent is extended or adjusted under 35 U.S.C. 154(b) by 307 days.

(21) Appl. No.: 12/933,901

(22) PCT Filed: Mar. 26, 2009

(86) PCT No.: PCT/JP2009/056037
§ 371 (c)(1),
(2), (4) Date: Sep. 22, 2010

(87) PCT Pub. No.: WO2009/119703
PCT Pub. Date: Oct. 1, 2009

(65) Prior Publication Data

US 2011/0010047 A1 Jan. 13, 2011

(30) Foreign Application Priority Data

Mar. 26, 2008 (JP) ................................ 2008-081549

(51) Int. Cl.
*G06F 19/00* (2006.01)

(52) U.S. Cl.
USPC ........................................................... 701/36

(58) Field of Classification Search
USPC ........................................................... 701/36
See application file for complete search history.

(56) References Cited

FOREIGN PATENT DOCUMENTS

| | | |
|---|---|---|
| JP | 2002-275945 | 9/2002 |
| JP | 2003-329012 | 11/2003 |
| JP | 2007-162458 | 6/2007 |
| JP | 2007-325727 | 12/2007 |

OTHER PUBLICATIONS

International Search Report mailed Jun. 30, 2009 in corresponding PCT International Application No. PCT/JP2009/056037.

*Primary Examiner* — Thomas Tarcza
*Assistant Examiner* — Maceeh Anwari
(74) *Attorney, Agent, or Firm* — Ostrolenk Faber LLP

(57) ABSTRACT

A controller of a hybrid construction machine which can achieve minimization of a required number of sensors is provided. A sub pump driven by output of an electric motor is connected to discharge sides of main pumps. Proportional solenoid throttling valves are provided in connection process between the sub pump and the main pumps for controlling a flow rate supplied from the sub pump to the main pump. A control unit is provided for electrically controlling the openings of the proportional solenoid throttling valves. Pressure sensors are connected to the control unit which controls the openings of the proportional solenoid throttling valves in response to pressure signals from the pressure sensors.

2 Claims, 2 Drawing Sheets

CONTROLLER OF HYBRID CONSTRUCTION MACHINE

CROSS-REFERENCE TO RELATED APPLICATIONS

The present application is a 35 U.S.C. §§371 national phase conversion of PCT/JP2009/056037, filed Mar. 26, 2009, which claims priority of Japanese Patent Application No. 2008-081549, filed Mar. 26, 2008. The PCT International Application was published in the Japanese language.

TECHNICAL FIELD

This invention relates to a controller for controlling a power source of a construction machine such as, for example, a power shovel and the like.

BACKGROUND

A hybrid structure in a construction machine such as a power shovel uses, for example, an excess output of an engine to rotate a generator for electric power generation or discharge energy from an actuator to rotate a generator for electric power generation, and also uses the electric power of the generator to rotate an electric motor for actuation of an actuator and/or the like.

In this case, a controller obtains the operating conditions of the actuator to rotate the generator or drive the electric motor. For obtaining the operating conditions of the actuator, a sensor is provided in each operated valve for detecting the operating conditions of the operated valve as disclosed in, for example, Patent Literature 1.

[Patent Literature 1] JP-A 2002-275945

SUMMARY OF THE INVENTION

Technical Problem

This related art controller must comprise sensors respectively provided in operated valves for detecting the operating conditions for the valves. For this reason, an increase in the number of sensors is unavoidable. There is a disadvantageous problem that the larger number of sensors, the higher cost.

It is an object of the present invention to provide a controller of a hybrid construction machine which can achieve minimization of a required number of sensors.

Solution to Problem

A first invention provides a controller of a hybrid construction machine comprising: a main pump that is of a variable displacement type and connected to a circuit system including a plurality of operated valves, a regulator provided in the main pump for controlling a tilt angle of the main pump, a pilot passage provided in the circuit system for guiding a pilot pressure produced when switching operation is performed on any of the operated valves, and a pressure sensor provided in the pilot passage for detecting a pilot pressure, in which the pilot passage provided in the circuit system is connected to the regulator provided in the main pump, Also, a sub pump of a variable displacement type that is driven by output of an electric motor is connected to a delivery side of the main pump, and a tilt-angle control unit is provided in the sub pump for controlling a tilt angle of the sub pump. Also, a control unit is provided in the sub pump for controlling the tilt-angle control unit, in which the pressure sensor is connected to the control unit, and the control unit controls a tilt angle of the sub pump in response to a pressure signal from the pressure sensor.

A second invention comprises a first main pump and a second main pump of a variable displacement type. The first and second main pumps are respectively connected to a first circuit system including a plurality of operated valves and a second circuit system including a plurality of operated valves. Regulators are provided in the first and second main pumps for controlling tilt angles of the first and second main pumps, and pilot passages are respectively provided in the first and second circuit systems for guiding pilot pressures produced when switching operation is performed on any of the operated valves. The pilot passage provided in the first circuit system is connected to the regulator provided in the first main pump, while the pilot passage provided in the second circuit system is connected to the regulator provided in the second main pump. Further, the sub pump is connected to delivery sides of the first and second main pumps, and a first proportional solenoid throttling valve for controlling a flow rate supplied from the sub pump to the first main pump, and a second proportional solenoid throttling valve for controlling a flow rate supplied from the sub pump to the second main pump are provided in a connection route between the sub pump and the first and second main pumps.

Advantageous Effects of Invention

According to the first invention, since a necessary number of pressure sensors is equal to the number of pilot passages, a significant cost reduction can be achieved unlike the case where a pressure sensor is required for each operated valve as in the related art.

According to the second invention, since the tilt angle of the sub pump and the degree of opening of the proportional solenoid throttling valve are controlled in response to manipulation conditions of the operated valves, it is possible to implement optimum hybrid control based on the output of the electric motor.

DESCRIPTION OF EMBODIMENTS

FIG. 1 illustrates a controller of a power shovel according to an embodiment of the present invention, which includes a variable displacement type of first and second main pump MP1, MP2. The first main pump MP 1 is connected to a first circuit system, while the second main pump MP 2 is connected to a second circuit system.

To the first circuit system are connected, in upstream to downstream order, a rotation-motor operated valve 1 for controlling a rotation motor RM, an arm-in-first-gear operated valve 2 for controlling an arm cylinder (not shown), a boom-in-second-gear operated valve 3 for controlling a boom cylinder BC, an auxiliary operated valve 4 for controlling an auxiliary attachment (not shown), and a left-travel-motor operated valve 5 for controlling a left travel motor (not shown).

Each of the operated valves 1 to 5 is connected to the first main pump MP1 via a neutral flow passage 6 and a parallel passage 7.

A pilot pressure generating mechanism 8 is disposed in the neutral flow passage 6 downstream from the left-travel-motor operated valve 5. The pilot pressure generating mechanism 8 generates a higher pilot pressure with a higher rate of flow passing through the mechanism 8, and a lower pilot pressure with a lower rate of flow.

When all the operated valves 1 to 5 are in a neutral position or around a neutral position, the neutral flow passage 6 guides all or part of the fluid discharged from the first main pump MP1 to a tank T. At this stage, the rate of flow passing through the pilot-pressure generating mechanism 8 is increased, so that a high pilot pressure is generated as described above.

On the other hand, when the operated valves 1 to 5 are switched to the full stroke position, the neutral flow passage 6 is closed to block the flow of fluid. In this case, accordingly, the rate of flow passing through the pilot-pressure generating mechanism 8 is almost zero, which means that a pilot pressure of zero is kept.

However, depending on manipulated variables for the operated valves 1 to 5, a portion of the pump discharge flow is guided to an actuator and another portion is guided from the neutral flow passage 6 to the tank T. As a result, the pilot pressure generating mechanism 8 generates a pilot pressure in accordance with the rate of flow passing through the neutral flow passage 6. In other words, the pilot pressure generating mechanism 8 generates a pilot pressure in accordance with a manipulated variable for the operated valves 1 to 5.

A pilot flow passage 9 is connected to the pilot-pressure generating mechanism 8, and also connected to a regulator 10 for controlling the tilt angle of the first main pump MP1. The regulator 10 controls the discharge rate of the first main pump MP1 in inverse proportion to the pilot pressure. Accordingly, when the operated valves 1 to 5 are fully stroked and the flow rate in the neutral flow passage 6 changes to zero, in other words, when the pilot pressure generated by the pilot-pressure generating mechanism 8 reaches zero, the discharge rate of the first main pump MP1 is maintained at a maximum.

A first pressure sensor 11 is connected to the pilot flow passage 9 configured as described above, and detects a pressure signal which is then applied to a control unit C.

In turn, to the second circuit system are connected, in upstream to downstream order, a right-travel-motor operated valve 12 for controlling a right travel motor (not shown), a bucket operated valve 13 for controlling a bucket cylinder (not shown), a boom-in-first-gear operated valve 14 for controlling the boom cylinder BC, and an arm-in-second-gear operated valve for controlling the arm cylinder (not shown). Note that the boom-in-first-gear operated valve 14 is provided with a sensor 14*a* for detecting a manipulated direction and a manipulated variable for the operated valve 14.

Each of the operated valves 12 to 15 is connected to the second main pump MP2 through the neutral flow passage 16. The bucket operated valve 13 and the boom-in-first-gear operated valve 14 are connected to the second main pump MP2 through a parallel passage 17.

A pilot-pressure generating mechanism 18 is provided in the neutral flow passage 16 downstream from the arm-in-second-gear operated valve 15. The pilot-pressure generating mechanism 18 is exactly identical in function with the pilot-pressure generating mechanism 8 described earlier.

A pilot flow passage 19 is connected to the pilot-pressure generating mechanism 18, and also connected to a regulator 20 for controlling the tilt angle of the second main pump MP2. The regulator 20 controls the discharge rate of the second main pump MP2 in inverse proportion to the pilot pressure. Accordingly, when the operated valves 12 to 15 are fully stroked and the flow rate in the neutral flow passage 16 changes to zero, in other words, when the pilot pressure generated by the pilot-pressure generating mechanism 18 reaches zero, a maximum discharge rate of the second main pump MP2 is maintained.

A second pressure sensor 21 is connected to the pilot flow passage 19 configured as described above, and detects a pressure signal which is then applied to the control unit C.

The first, second main pumps MP1, MP2 arranged as described above rotate coaxially by a drive force of a single engine E. The engine E is equipped with a generator 22, such that the generator 22 is rotated by an excess output of the engine E for electric generation. The electric power generated by the generator 22 passes through a battery charger 23 to recharge the battery 24.

The battery charger 23 is adapted to recharge the battery 24 even when it is connected to an ordinary household power source 25. That is, the battery charger 23 is connectable to an independent power source other than the controller.

An actuator port of the rotation-motor operated valve 1 connected to the first circuit system is connected to passages 26, 27 which communicate with the rotation motor RM. Brake valves 28, 29 are respectively connected to the passages 26, 27. When the rotation motor operated valve 1 is kept in its neutral position (not shown), the actuator port is closed, so that the rotation motor RM maintains its stop state.

The rotation-motor operated valve 1 is switched from this position to, for example, a right position in FIG. 1, whereupon one passage 26 of the passages 26, 27 is connected to the first main pump MP1, while the other passage 27 is connected to the tank T. As a result, pressure fluid is supplied through the passage 26 to rotate the rotation motor RM, while the return fluid flows from the rotation motor RM through the passage 27 back to the tank T.

On the other hand, when the rotation-motor operated valve 1 is switched to a left position, the pump discharge fluid flows into the passage 27, while the passage 26 is connected to the tank T, so that the rotation motor RM rotates in the opposite direction.

In this manner, during the operation of the rotation motor RM, the brake valve 28 or 29 functions as a relief valve. Then, when the pressure in the passage 26, 27 exceeds a set pressure, the brake valve 28, 29 is opened to introduce the fluid from the high pressure side to the low pressure side. When the rotation-motor operated valve 1 is moved back to the neutral position while the rotation motor RM is rotating, the actuator port of the operated valve 1 is closed. Even when the actuator port of the operated valve 1 is closed in this manner, the rotation motor RM continues to rotate by its inertial energy. By rotating by its inertial energy, the rotation motor RM acts as a pump. At this stage, the passages 26, 27, the rotation motor RM and the brake valve 28 or 29 form a closed circuit. The brake valve 28 or 29 converts the inertial energy to thermal energy.

On the other hand, when the boom-in-first-gear operated valve 14 is switched from the neutral position to a right position in FIG. 1, the pressure fluid flowing from the second main pump MP2 is supplied through a passage 30 to a piston chamber 31 of the boom cylinder BC, and the return fluid flows from a rod chamber 32 of the boom cylinder BC through a passage 33 to the tank T, resulting in extension of the boom cylinder BC.

In contrary, upon switching of the boom-in-first-gear operated valve 14 to the left direction in FIG. 1, a pressure fluid flowing from the second main pump MP2 is supplied through the passage 33 to the rod chamber 32 of the boom cylinder BC, while the return fluid flows from the piston chamber 31 through the passage 30 back to the tank T, resulting in contraction of the boom cylinder BC. Note that the boom-in-second-gear operated valve 3 is switched in conjunction with the boom-in-first-gear operated valve 14.

A proportional solenoid valve 34, the degree of opening of which is controlled by the control unit C, is provided in the passage 30 connected between the piston chamber 31 of the boom cylinder BC and the boom-in-first-gear operated valve 14 as described above. Note that the proportional solenoid valve 34 is kept in the full open position when it is in its normal state.

Next, a variable displacement sub-pump SP for assisting in the output of the first, second main pump MP1, MP2 will be described.

The variable displacement sub-pump SP rotates by a drive force of an electric motor MG also serving as a generator, and a variable displacement assist motor AM also rotates coaxially by the drive force of the electric motor MG. The electric motor MG is connected to an inverter I. The inverter I is connected to the control unit C. Thus, the control unit C can control a rotational speed and the like of the electric motor MG.

Tilt angles of the sub pump SP and the assist motor AM are controlled by tilt-angle control units 35, 36 which are controlled through output signals of the control unit C.

The sub-pump SP is connected to a discharge passage 37. The discharge passage 37 is divided into two passages, a first merging passage 38 that merges with the delivery side of the first main pump MP1 and a second merging passage 39 that merges with the delivery side of the second main pump MP2. The first, second merging passages 38, 39 are respectively provided with first, second proportional solenoid throttling valves 40, 41 the degrees of opening of which are controlled by signals output from the control unit C.

On the other hand, the assist motor AM is connected to a connection passage 42. The connection passage 42 is connected through the merging passage 43 and check valves 44, 45 to the passages 26, 27 which are connected to the rotation motor RM. In addition, a solenoid directional control valve 46, the opening/closing of which is controlled by the control unit C, is provided in the merging passage 43. A pressure sensor 47 is disposed between the solenoid directional control valve 46 and the check valves 44, 45 for detecting a pressure of the rotation motor RM during the turning operation or during the braking operation. A pressure signal of the pressure sensor 47 is applied to the control unit C.

A pressure relief valve 48 is provided in the merging passage 43 downstream from the solenoid directional control valve 46 for the flow from the rotation motor RM to the connection passage 42. The pressure relief valve 48 maintains the pressure in the passages 26, 27 to prevent so called run-away of the rotation motor RM in the event of a failure occurring in the system of the connection passages 42, 43, for example, in the solenoid directional control valve 46 or the like.

In addition, another passage 49 is provided between the boom cylinder BC and the proportional solenoid valve 34 and communicates with the connection passage 42. A solenoid on/off valve 50 controlled by the control unit C is disposed in the passage 49.

The operation of the embodiment will be described below. In the embodiment, the assist flow rate of the sub pump SP is preset, and then the control unit C determines how to control the tilt angle of the sub pump SP, the tilt angle of the assist motor AM, the rotational speed of the electric motor MG, and the like in order to achieve the most efficient control, and then performs the control on each of them.

Now, if the operated valves 1 to 5 in the first circuit system are kept in their neutral positions, the total amount of fluid discharged from the first main pump MP1 is introduced through the neutral passage 6 and the pilot pressure generating mechanism 8 to the tank T. When the total amount of fluid discharged from the first main pump MP1 flows through the pilot pressure generating mechanism 8 in this manner, the pilot pressure generating mechanism 8 generates a high pilot pressure, and a relatively high pilot pressure is introduced into the pilot passage 9. Then, the high pilot pressure introduced into the pilot passage 9 acts to actuate the regulator 10, so that the regulator 10 maintains the discharge rate of the first main pump MP1 at a minimum. A pressure signal indicative of the high pilot pressure at this stage is applied to the control unit C from the first pressure sensor 11.

Similarly, when the operated valves 12 to 15 in the second circuit system are kept in their neutral positions, the pilot pressure generating mechanism 18 generates a relatively high pilot pressure as in the case of the first circuit system, and the high pilot pressure acts on the regulator 20, so that the regulator 20 maintains the discharge rate of the second main pump MP2 at a minimum. A pressure signal indicative of the high pilot pressure at this stage is applied to the control unit C from the second pressure sensor 21.

Upon reception of the signal indicative of the relatively high pressure from the first, second pressure sensor 11, 21, the control unit C determines that the first, second main pump MP1, MP2 maintains a minimum discharge rate and controls the tilt control unit 35, 36 to reduce the tilt angles of the sub pump SP and the assist motor AM to zero or to a minimum.

Note that the control unit C may either stop or continue the rotation of the electric motor MG when the control unit C receives a signal indicative of a minimum discharge rate of the first, second main pump MP1, MP2 as described above.

When the rotation of the electric motor MG is stopped, there is an advantageous effect of reduced power consumption. When the rotation of the electric motor MG is continued, the sub pump SP and the assist motor AM continue to rotate. As a result, there is an advantageous effect of lessened impact occurring when the sub pump SP and the assist motor AM are started. In either case, whether the rotation of the electric motor MG should be stopped or continued to rotate may be determined with reference to a use or use environment of the construction machine.

By switching any operated valve in the first circuit system or the second circuit system under the conditions as described above, the rate of flow passing through the neutral passage 6 or 16 is reduced in accordance with the manipulated variable, which involves a reduction in the pilot pressure generated by the pilot pressure generating mechanism 8 or 18. As the pilot pressure reduces, the first main pump MP1 or the second main pump MP2 increases its tilt angle to increase its discharge rate.

When the discharge rate of the first main pump MP 1 or the second main pump MP2 increases as described above, the control unit C maintains the electric motor MG in the rotating state at all times. That is, if the electric motor MG is stopped when the discharge rate of the first, second main pump MP1, MP2 reaches a minimum, the control unit C detects a reduction in pilot pressure and re-starts the electric motor MG.

Then, the control unit C controls the degrees of opening of the first, second proportional solenoid throttling valves 40, 41 in response to the pressure signals from the first, second pressure sensors 11, 21, to proportionally divide the discharge flow of the sub pump SP for delivery to the first, second circuit systems.

According to the embodiment, since the control unit C can control the tilt angle of the sub pump SP and the degrees of opening of the first, second proportional solenoid throttling valves 40, 41 in response to only two pressure signals from the first, second pressure sensors 11, 21, a reduction in the number of pressure sensors can be achieved.

On the other hand, for driving the rotation motor RM connected to the first circuit system, the rotation-motor operated valve 1 is switched to either right or left position. For example, switching of the operated valve 1 to the right position in FIG. 1 causes one passage 26 of the passages 26, 27 to communicate with the first main pump MP1 and the other passage 27 to communicate with the tank T in order to rotate the rotation motor RM. The turning pressure at this time is maintained at a set pressure of the brake valve 28. On the other hand, when the operated valve 1 is switched to the left position in FIG. 1, the passage 27 communicates with the first main pump MP1 while the passage 26 communicates with the tank T in order to rotate the rotation motor RM. The turning pressure at this time is maintained at a set pressure of the brake valve 29.

When the rotation-motor operated valve 1 is switched to the neutral position during the turning operation of the rotation motor RM, a closed circuit is constituted between the passages 26, 27 as described earlier, and the brake valve 28 or 29 keeps the brake pressure in the closed circuit for conversion of inertial energy to thermal energy.

The pressure sensor 47 detects a turning pressure or a brake pressure and applies a signal indicative of the detected pressure to the control unit C. When the detected pressure is lower than the set pressure of brake valve 28, 29, while within a range where this has no effect on the turning operation of the rotation motor RM or the braking operation, the control unit C switches the solenoid directional control valve 46 from the closed position to the open position. With this switching of the solenoid directional control valve 46 to the open position, the pressure fluid introduced into the rotation motor RM flows into the merging passage 43 and then through the pressure relief valve 48 and the connection passage 42 into the assist motor AM.

At this stage, the control unit C controls the tilt angle of the assist motor AM in response to the pressure signal from the pressure sensor 47 as follows.

Specifically, if the pressure in the passage 26 or 27 is not maintained at a level required for the turning operation or the braking operation, the rotation motor RM cannot be operated for the turning operation or the brake operation.

For this reason, in order to maintain the pressure in the passage 26 or 27 at a level equal to the turning pressure or the brake pressure, the control unit C controls the load on the rotation motor RM while controlling the tilt angle of the assist motor AM. Specifically, the control unit C controls the tilt angle of the assist motor AM such that the pressure detected by the pressure sensor 47 becomes approximately equal to the turning pressure of the rotation motor RM or the brake pressure of the rotation motor RM.

If the assist motor AM obtains a torque as described above, then the torque acts on the electric motor MG which rotates coaxially with the assist motor AM, which means that the torque of the assist motor AM acts as an assist force intended to the electric motor MG. This makes it possible to reduce the power consumption of the electric motor MG by an amount of power corresponding to the torque of the assist motor AM.

The torque of the assist motor AM may be used to assist the torque of the sub pump SP. In this event, the assist motor AM and the sub pump SP are combined with each other to perform the pressure conversion function.

That is, the pressure of the fluid flowing into the connection passage 42 is inevitably lower than the pump discharge pressure. In order to employ this low pressure to maintain a high discharge pressure of the sub pump SP, the assist motor AM and the sub pump SP are adapted to perform the booster function.

Specifically, the output of the assist motor AM depends on the product of a displacement volume $Q_1$ per rotation and the pressure $P_1$ at this time. Likewise, the output of the sub pump SP depends on the product of a displacement volume $Q_2$ per rotation and the discharge pressure $P_2$. In the embodiment, since the assist motor AM and the sub pump SP rotate coaxially, equation $Q_1 \times P_1 = Q_2 \times P_2$ must be established. For this purpose, for example, assuming that the displacement volume $Q_1$ of the assist motor AM is three times as high as the displacement volume $Q_2$ of the sub pump SP, that is, $Q_1 = 3Q_2$, the equation $Q_1 \times P_1 = Q_2 \times P_2$ results in $3Q_2 \times P_1 = Q_2 \times P_2$. Dividing both sides of this equation by $Q_2$ gives $3P_1 = P_2$.

Accordingly, if the tilt angle of the sub pump SP is changed to control the displacement volume $Q_2$, a predetermined discharge pressure of the sub pump SP can be maintained using the output of the assist motor AM. In other words, the pressure of the fluid from the rotation motor RM can be built up and then the fluid can be discharged from the sub pump SP.

In this regard, the tilt angle of the assist motor AM is controlled such that the pressure in the passage 26, 27 is maintained at a level equal to the turning pressure or the brake pressure. For this reason, in the case of using the fluid flowing from the rotation motor RM, the tilt angle of the assist motor AM is logically determined. After the tilt angle of the assist motor AM has been determined in this manner, the tilt angle of the sub pump SP is controlled in order to perform the pressure conversion function.

If the pressure in the system of the connection passages 42, 43 is reduced below the turning pressure or the brake pressure for any reasons, the control unit C closes the solenoid directional control valve 46 on the basis of a pressure signal sent from the pressure sensor 47 such that the rotation motor RM is not affected.

When a fluid leak occurs in the connection passage 42, the pressure relief valve 48 operates to prevent the pressure in the passage 26, 27 from being reduced more than necessary, thus preventing runaway of the rotation motor RM.

Next, a description will be given of control for the boom cylinder by switching the boom-in-first-gear operated valve 14 and the boom-in-second-gear operated valve 3 in the first circuit system working in conjunction with the operated valve 14.

The boom-in-first-gear operated valve 14 and the operated valve 3 working in conjunction with it are switched in order to actuate the boom cylinder BC, whereupon the sensor 14*a* detects the manipulated direction and the manipulated variable of the operated valve 14, and sends the manipulation signal to the control unit C.

The control unit C determines in response to the manipulation signal of the sensor 14*a* whether the operator is about to move up or down the boom cylinder BC. If the control unit C receives a signal indicative of moving-up of the boom cylinder BC, the control unit C maintains the proportional solenoid valve 34 in a normal state. In other words, the proportional solenoid valve 34 is kept in its full-open position. At this time, the control unit C keeps the solenoid on/off valve 50 in the closed position shown in FIG. 1 and controls the rotational speed of the electric motor MG and the tilt angle of the sub pump SP in order to ensure a predetermined discharge rate of the sub pump SP.

On the other hand, if the control unit C receives a signal from the sensor 14*a* indicative of the moving-down of the boom cylinder BC from the sensor 14*a*, the control unit C calculates a moving-down speed of the boom cylinder BC desired by the operator in accordance with the manipulated variable of the operated valve 14, and closes the proportional solenoid valve 34 and switches the solenoid on/off valve 50 to the open position.

By closing the proportional solenoid valve 34 and switching the solenoid on/off valve 50 to the open position as described above, the total amount of return fluid from the boom cylinder BC is supplied to the assist motor AM. However, if the flow rate consumed by the assist motor AM is lower than the flow rate required for maintaining the moving-down speed desired by the operator, the boom cylinder BC cannot maintain the moving-down speed desired by the operator. In this event, the control unit C controls, based on the manipulated variable of the operated valve 14, the tilt angle of the assist motor AM, the rotational speed of the electric motor MG and the like, the degree of opening of the proportional solenoid valve 34 to direct a greater flow rate than that consumed by the assist motor AM back to the tank T, thus maintaining the moving-down speed of the boom cylinder BC desired by the operator.

On the other hand, with the flow of fluid flowing into the assist motor AM, the assist motor AM rotates and this torque acts on the electric motor MG which rotates coaxially. In turn, the torque of the assist motor AM acts as an assist force intended to the electric motor MG. Thus, the power consumption can be reduced by an amount of power corresponding to the torque of the assist motor AM.

In this regard, the sub pump SP can be rotated using only a torque of the assist motor AM without a power supply to the electric motor MG. In this case, the assist motor AM and the sub pump SP perform the pressure conversion function as in the aforementioned case.

Next, the simultaneous actuation of the rotation motor RM for the turning operation and the boom cylinder BC for the moving-down operation will be described.

When the boom cylinder BC is moved down while the rotation motor RM is operated for the turning operation, the fluid from the rotation motor RM and the return fluid from the boom cylinder BC join up in the connection passage 42 and flow into the assist motor AM.

In this regard, if the pressure in the connection passage 42 rises, the pressure in the merging passage 43 also rises with this pressure rise. Even if the pressure in the merging passage 43 exceeds the turning pressure or the brake pressure of the rotation motor RM, it has no effect on the rotation motor RM because the check valves 44, 45 are provided.

If the pressure in the connection passage 42 reduces lower than the turning pressure or the brake pressure, the control unit C closes the solenoid directional control valve 46 on the basis of a pressure signal from the pressure sensor 47.

Accordingly, when the turning operation of the rotation motor RM and the moving-down operation of the boom cylinder BC are simultaneously performed, the tilt angle of the assist motor AM may be determined with reference to the required moving-down speed of the boom cylinder BC irrespective of the turning pressure or the brake pressure.

At all events, the output of the assist motor AM can be used to assist the output of the sub pump SP, and also the amount of fluid discharged from the sub pump SP can be proportionally divided at the first, second proportional solenoid throttling valves 40, 41 for delivery to the first, second circuit systems.

On the other hand, for use of the assist motor AM as a drive source and the electric motor MG as a generator, the tilt angle of the sub pump SP is changed to zero such that the sub pump SP is put under approximately no-load conditions, and the assist motor AM is maintained in the state of producing the output required for rotating the electric motor MG. By doing so, the output of the assist motor AM can be used to allow the electric motor MG to perform the generator function.

In the embodiment, the output of the engine E can be used to allow the generator 22 to generate electric power or the assist motor AM can be used to allow the electric motor MG to generate electric power. Then, the electric power thus generated is accumulated in the battery 24. In this connection, in the embodiment, since the household power source 25 may be used to accumulate electric power in the battery 24, the electric power of the electric motor MG can be utilized for various components.

In the embodiment, on the other hand, the fluid from the rotation motor RM or the boom cylinder BC can be used to rotate the assist motor AM, and also the output of the assist motor AM can be used to assist the sub pump SP and the electric motor MG. This makes it possible to minimize the energy loss produced until regenerated power is available. For example, in the related art, the fluid from the actuator is used to rotate a generator, and then the electric power accumulated by the generator is used to drive the electric motor, and then the driving force of the electric motor is used to actuate the actuator. As compared with this arrangement of the related art, the regenerated power of the fluid pressure can be used directly.

FIG. 2 illustrates another embodiment, in which the proportional solenoid valve 34 and the solenoid on/off valve 50 shown in FIG. 1 are combined. The proportional solenoid valve 51 is usually kept in the open position shown in FIG. 2 under normal conditions, and upon reception of a signal from the control unit C, the proportional solenoid valve 51 is switched to a right position in FIG. 2. In the proportional solenoid valve 51 switched to the right position in FIG. 2, a throttle 51*a* is located in the communicating route between the boom cylinder BC and the tank T, and a check valve 51*b* is located between the boom cylinder BC and the assist motor AM. The degree of opening of the throttle 51*a* is controlled in accordance with the amount of switching of the proportional solenoid valve 51. The rest of the structure is the same as that of the solenoid valve in FIG. 1.

Note that reference numerals 52, 53 in FIG. 1 denote check valves located downstream of the first, second proportional solenoid throttling valves 40, 41, which permit the fluid to flow from the sub pump SP to the first, second main pumps MP1, MP2 only.

Since the check valves 52, 53 are provided and the solenoid directional control valve 46 and the solenoid on/off valve 50 or the proportional solenoid valve 51 are provided as described above, for example, when a failure occurs in the system of the sub pump SP and the assist motor AM, the system of the first, second main pumps MP1, MP2 can be detached from the system of the sub pump SP and the assist motor AM. In particular, when the solenoid directional control valve 46, the proportional solenoid valve 51 and the solenoid on/off valve 50 are in their normal conditions, each of them is kept in its normal position, which is the closed position by a spring force of a spring as illustrated in the drawings, and also the proportional solenoid valve 34 and the proportional solenoid valve 51 are kept in their normal positions which are the full open position. For this reason, even if a failure occurs in the electric system, the system of the first, second main pumps MP1, MP2 can be detached from the system of the sub pump SP and the assist motor AM as described above.

REFERENCE SIGNS LIST

Figure 1:
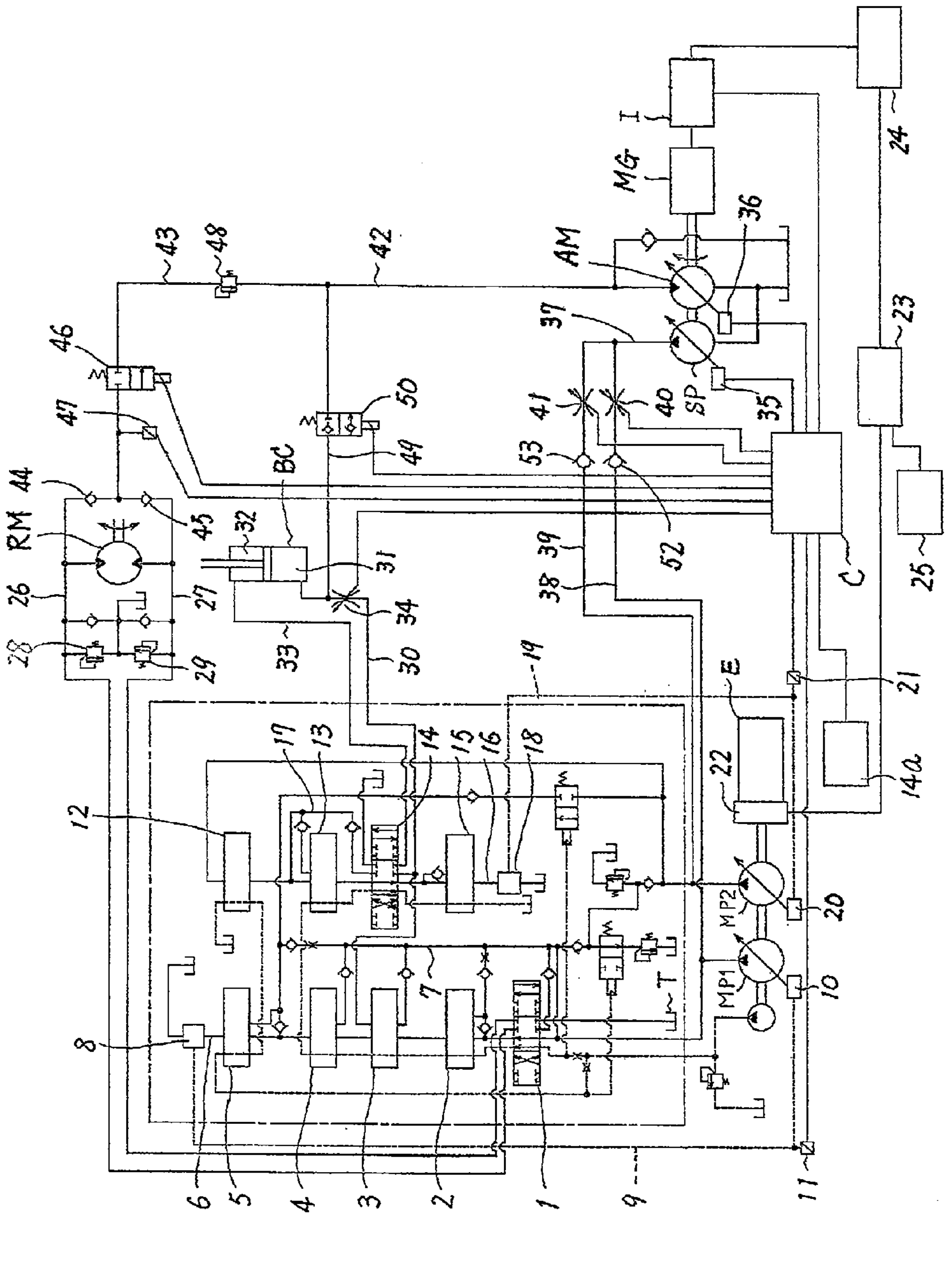
FIG. 1 is a circuit diagram illustrating an embodiment according to the present invention.
Figure 2:
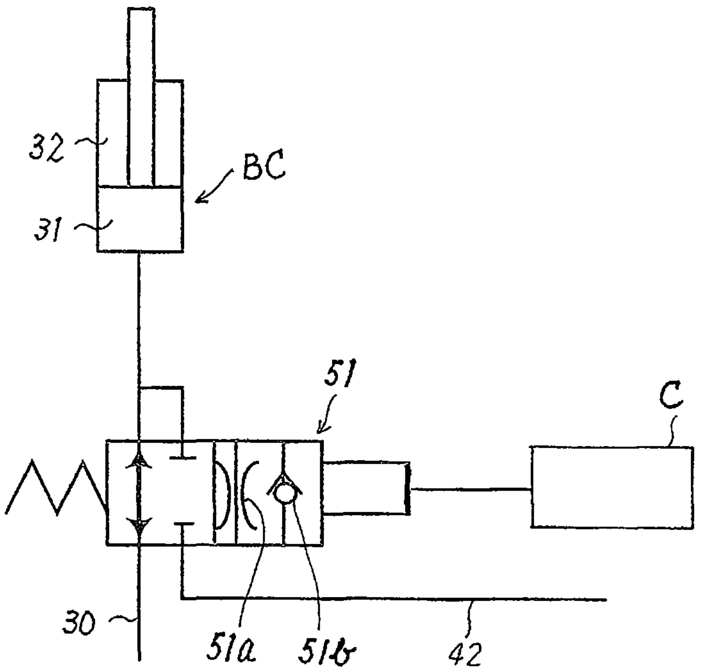
FIG. 2 is a circuit diagram partially illustrating another embodiment of a proportional solenoid valve.

MP1 First main pump
MP2 Second main pump
1 Rotation-motor operated valve
2 Arm-in-first-gear operated valve
BC Boom cylinder
3 Boom-in-second-gear operated valve
4 Auxiliary operated valve
5 Left-travel-motor operated valve
9 Pilot passage
10 Regulator
11 First pressure sensor
C Control unit
12 Right-travel-motor operated valve
13 Bucket operated valve
14 Boom-in-first-gear operated valve
15 Arm-in-second-gear operated valve
19 Pilot passage
20 Regulator
21 Second pressure sensor
SP Sub pump
35, 36 tilt-angle control unit
AM Assist motor
MG Electric motor serving as generator
40, 41 First, second proportional solenoid throttling valve

The invention claimed is:

1. A controller of a hybrid construction machine, comprising:

a main pump of a variable displacement type that is connected to a circuit system including a plurality of operated valves, a regulator provided in the main pump for controlling a tilt angle of the main pump, a pilot passage provided in the circuit system for guiding a pilot pressure produced when switching operation is performed on any of the operated valves, a pressure sensor provided in the pilot passage for detecting a pilot pressure, wherein the pilot passage provided in the circuit system is connected to the regulator provided in the main pump, a sub pump of a variable displacement type that is driven off output of an electric motor and connected to a discharge side of the main pump, a tilt-angle control unit provided in the sub pump for controlling a tilt angle of the sub pump, and a control unit provided in the sub pump for controlling the tilt-angle control unit, wherein the pressure sensor is connected to the control unit, and the control unit controls a tilt angle of the sub pump in response to a pressure signal from the pressure sensor.

2. The controller of a hybrid construction machine according to claim 1, comprising:

a first main pump and a second main pump comprising said main pump and being of a variable displacement type and respectively connected to a first circuit system including a plurality of operated valves and a second circuit system including a plurality of operated valves, regulators provided in the first and second main pumps for controlling tilt angles of the first and second main pumps, pilot passages respectively provided in the first and second circuit systems for guiding pilot pressures produced when switching operation is performed on any of the operated valves, the pilot passage provided in the first circuit system being connected to the regulator provided in the first main pump, the pilot passage provided in the second circuit system being connected to the regulator provided in the second main pump, and the sub pump is connected to discharge sides of the first and second main pumps, and a first proportional solenoid throttling valve and a second proportional solenoid throttling valve provided in connection process between the sub pump and the first and second main pumps, the first proportional solenoid throttling valve controlling a flow rate supplied from the sub pump to the first main pump, and the second proportional solenoid throttling valve controlling a flow rate supplied from the sub pump to the second main pump.

* * * * *